(12) United States Patent

Veal et al.

(10) Patent No.: US 9,645,739 B2
(45) Date of Patent: May 9, 2017

(54) HOST-MANAGED NON-VOLATILE MEMORY

(71) Applicant: Intel Corporation, Santa Clara, CA (US)

(72) Inventors: Bryan E. Veal, Beaverton, OR (US); Dan J. Williams, Forest Grove, OR (US); Annie Foong, Aloha, OR (US)

(73) Assignee: INTEL CORPORATION, Santa Clara, CA (US)

( * ) Notice: Subject to any disclaimer, the term of this patent is extended or adjusted under 35 U.S.C. 154(b) by 302 days.

(21) Appl. No.: 14/498,909

(22) Filed: Sep. 26, 2014

(65) Prior Publication Data

US 2016/0092113 A1 Mar. 31, 2016

(51) Int. Cl.
G06F 12/00 (2006.01)
G06F 3/06 (2006.01)
G06F 12/02 (2006.01)

(52) U.S. Cl.
CPC .......... G06F 3/0608 (2013.01); G06F 3/064 (2013.01); G06F 3/0679 (2013.01); G06F 12/0246 (2013.01); G06F 12/0292 (2013.01); G06F 2212/1044 (2013.01); G06F 2212/2022 (2013.01); G06F 2212/251 (2013.01); G06F 2212/7201 (2013.01); G06F 2212/7207 (2013.01)

(58) Field of Classification Search
None
See application file for complete search history.

(56) References Cited

U.S. PATENT DOCUMENTS

| 8,806,115 | B1 | 8/2014 | Patel et al. |
| 8,954,657 | B1* | 2/2015 | Asnaashari ......... G06F 12/0246 711/103 |
| 2011/0302172 | A1 | 12/2011 | Chandrasekar et al. |
| 2012/0096216 | A1 | 4/2012 | Lee et al. |
| 2012/0271813 | A1 | 10/2012 | Shen et al. |
| 2015/0193339 | A1* | 7/2015 | Kim ..................... G06F 12/0246 711/103 |

FOREIGN PATENT DOCUMENTS

EP 1653358 A2 5/2006

OTHER PUBLICATIONS

International Search Report and Written Opinion issued in PCT Application No. PCT/US2015/051008, dated Mar. 18, 2016, 13 pages.

(Continued)

*Primary Examiner* — Adam M Queler
*Assistant Examiner* — Edmund Kwong
(74) *Attorney, Agent, or Firm* — Grossman. Tucker, Perreault & Pfleger, PLCC

(57) ABSTRACT

One embodiment provides a computing device. The computing device includes a processor; a chipset; a memory; and indirection logic. The indirection logic is to receive a host logical block address (LBA) associated with a first sector of data, map the host LBA from a host address space to a first device LBA in a device address space, the device address space related to a non-volatile memory (NVM) storage device physical memory address space, and provide the first sector of data and the first device LBA to the NVM storage device.

18 Claims, 9 Drawing Sheets

(56) References Cited

OTHER PUBLICATIONS

FUSION-IO: "Accelerate MySQL with Fusion's Atomic Writes Extension", www.fusionio.com, 2012, 1 page.
Knight, F.: "File Systems and Thin Provisioning", NetApp, Storage Developer Conference, Santa Clara, 2011, 30 pages.
Elliott, R., et al.: "13-064r1 SBC-5 Atomic writes and reads", T10 Technical Committee, May 5, 2013, 21 pages.
NVM Express, Revision 1.1, Oct. 11, 2012, 163 pages.
Rodeh, O.: "B-trees, Shadowing, and Clones", IBM Haifa Research Labs, ACM Transactions on Storage, vol. 3, No. 4, Article 15, Feb. 2008, 27 pages.
Comer, D.: "The Ubiquitous B-Tree", Computing Surveys, vol. 11, No. 2, Jun. 1979, 17 pages.
Talagala, T.: http://www.fusionio.com/blog/under-the-hood-of-the-iomemory-sdk/, posted Apr. 18, 2012, 5 pages.

\* cited by examiner

HOST-MANAGED NON-VOLATILE MEMORY

FIELD

The present disclosure relates to non-volatile memory, in particular to, non-volatile memory in solid state drives.

BACKGROUND

Solid state drives (SSDs) are one type of non-volatile storage that may be used by computing devices. Some SSDs include block-based non-volatile memory, e.g., NAND-type flash memory, for storage. In NAND-type flash memory, memory cells are grouped into pages and blocks. A page may include a number of bytes (e.g., 4096), a block may include a number of pages (e.g., 128), and a NAND-type flash memory SSD may include a number of blocks (e.g., 1024), depending on a storage capacity of the SSD. In NAND flash memory, read and write operations are page-based. In other words, a page of data is a minimum amount that can be read/written. Thus, in order respond to an application request to read or write a lesser amount of data, a full page is read or written. Further, NAND-type flash memory requires that memory cells be erased prior to programming. Such erase operations are typically performed on block(s) of memory cells.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
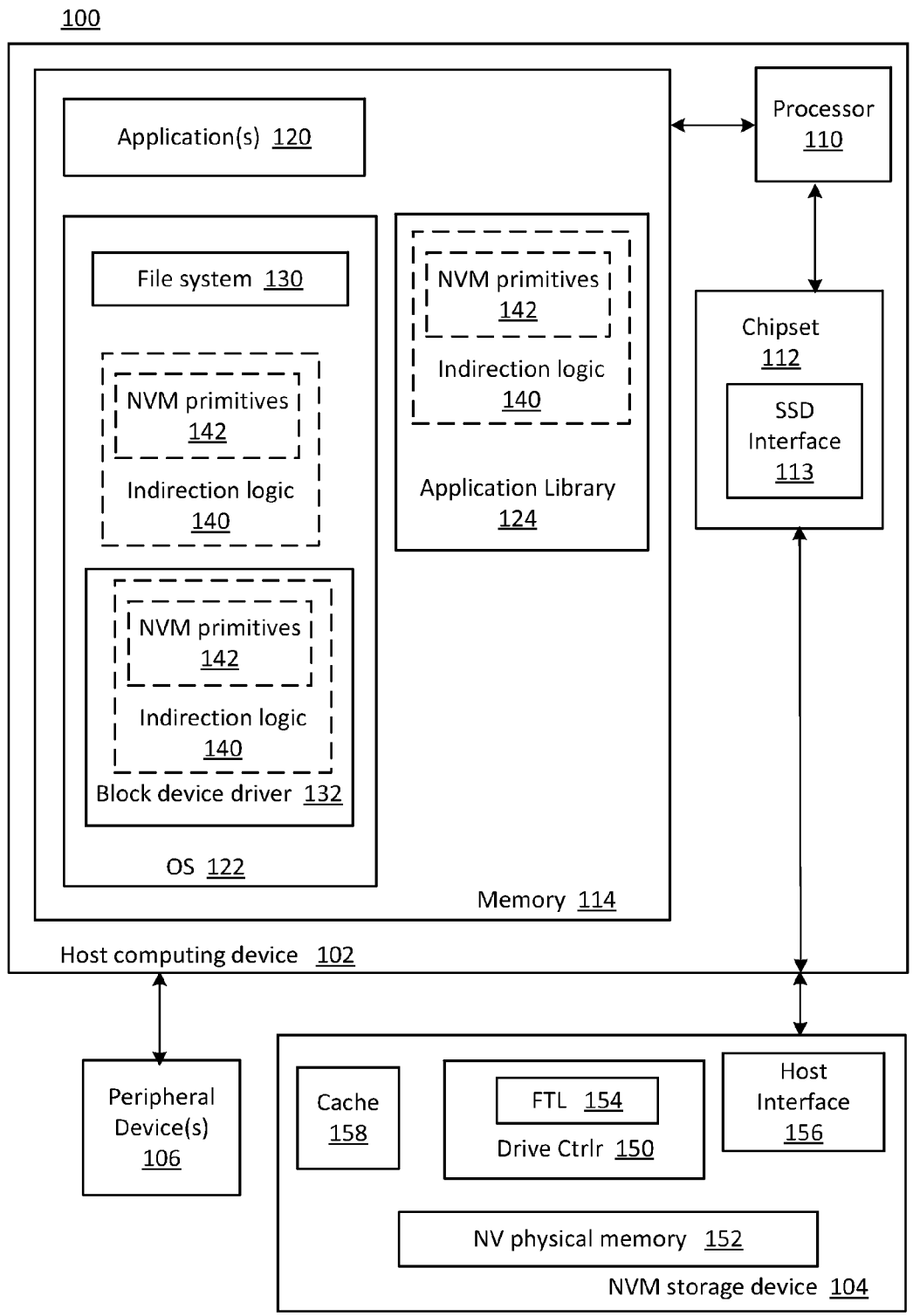
FIG. 1 illustrates a functional block diagram of a computing system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

In order to compensate for characteristics of block-based (e.g., NAND-type) solid state drives (SSDs), write operations may be managed by a host computing device and/or by an SSD controller to maximize an amount of data written to storage for each write operation. For example, data to be written may be buffered until a minimum amount of data, e.g., a page, is accumulated then the page of data may be written to contiguous memory locations. In another example, a full page of data may be read into, for example, a cache memory in an SSD, in response to a read request that includes memory addresses for only a portion of the page. Write operations may also be configured to facilitate erase operations, i.e., to maximize a number of contiguous pages, since erase operations are block-based.

Write operations to an SSD with block-accessible non-volatile memory typically utilize a log-structured storage technique. As used herein, "block-accessible" refers to a non-volatile memory that has a minimum size for memory accesses (e.g., one page). As used herein, "byte-accessible" refers to non-volatile memory that may be accessed by a word and/or a byte. "Byte-accessible" and "block-accessible" refer to accesses to physical memory addresses. In other words, it is transparent to an application that has requested a read or write operation how the physical memory is being accessed. Log-structured storage is configured to combine a plurality of individual random write operations into a single sequential write, thereby providing at least the minimum amount of data to be written. Data to be written may be buffered in volatile memory in a host until at least the minimum amount of data has accumulated. A "segment" may include at least one page of data, i.e. a minimum amount of data that can be written to the SSD. The segment of data may then be written to a contiguous block of previously erased memory locations in the SSD.

Write operations are further configured as copy-on-write. In copy-on-write, "old" data is not over-written, rather, updated ("new") data is written to different erased memory locations and the old data may be later erased. Copy-on-write may result in fragmented storage since each write is to a different block of storage and each write may include new data that corresponds to only a subset of "old" (i.e., previously stored) data.

Thus, log-structured storage may consume additional host non-volatile memory capacity storing data waiting to be written and computing resources to defragment free space. Defragmenting free space is configured to increase a number of contiguous pages. Log-structured storage may further delay commitment of data to an SSD since data ready to be written may be delayed, waiting for additional data to fill a page.

Generally, this disclosure relates to host-managed NVM (non-volatile memory) methods (and systems) for byte-accessible device-managed NVM storage devices. NVM storage devices include for example solid state drives (SSDs). The methods and systems include indirection logic in a host computing device that implements NVM primitives while avoiding log-structured storage and its associated overhead. NVM primitives include, but are not limited to, atomic multi-write, atomic write, sparse addressing, discard, verify, atomic discard and atomic multi-discard.

Atomic operations are configured to avoid uncertainty in a result of a memory access operation if that memory access operation was interrupted due, for example, to a power failure. In other words, in an atomic write, either all sectors designated to be written are written or no sectors are written. A sector corresponds to a number of bytes of data associated with a memory access operation. A sector may include any number of bytes of data. For example, a sector may include 512 bytes of data. In another example, a sector may include fewer than 512 bytes of data. In another example, a sector may include more than 512 bytes of data. If the write is interrupted, previously stored data ("old data") is maintained and the data that was to be stored ("new data") is not written. In an atomic discard, either all sectors are discarded or no sectors are discarded. Copy-on-write facilitates such atomicity since old data is not immediately overwritten.

The indirection logic is configured to manage writing sector(s) of data to a selected NVM storage device in response to a write request without waiting for additional sectors to accumulate. The indirection logic provides an indirection layer configured to map host logical block address(es) (LBA(s)) to device LBA(s). Logical block addressing provides an abstraction between physical storage media (i.e., physical memory) and, for example, an operating system (OS). For example, a host LBA used by an application and/or OS may be mapped to a device LBA that may then be related to a physical memory address of the storage device. A block typically includes a plurality of memory locations. For example, a block may include a sector and an LBA may then correspond to one sector. An application may be configured to read from and/or write to a range of host LBAs. The range of host LBAs may be mapped (i.e., translated) to a corresponding range of device LBAs and/or physical memory addresses. A host address space may be larger than device address space. A previously unmapped host LBA may be dynamically mapped to a device LBA in response to a write request.

A device-managed NVM storage device may include a flash translation layer (FTL) on the storage device, for example, in a drive controller. The FTL is configured to map and/or translate a device LBA to a physical memory address. The drive controller may then perform operations associated with actually storing the data to the NVM storage device.

The device address space may include metadata, a transaction log and a data portion. The data portion includes a free space, free list, index nodes configured as, for example, a search tree and stored data. The data is stored in one or more data extents. As used herein, "extent" corresponds to one or more contiguous units of storage. For example, the unit of storage may correspond to a byte, a sector (e.g., 512 bytes), a page, a block, etc. The tree structure may include a B-tree, a B$^+$-tree and/or one or more variants thereof. For example, a B$^+$-tree includes a root node, may include one or more internal nodes and one or more leaf node(s). The root node contains indexes and pointers to the internal nodes. The indexes are related to host LBA(s). In some embodiments, the one or more of the index(es) may correspond to host LBA(s). The internal nodes contain indexes and pointers to the leaf nodes. Each leaf node contains a host LBA, an associated device LBA and a length. In some embodiments, a leaf node may contain a plurality of sets of host LBA, associated device LBA and length. Each leaf node is configured to map a range of host LBAs to a corresponding range of device LBAs. Length corresponds to a size of the range of device LBAs and may correspond to a size of a data extent that starts at the device LBA. Size may be in units of storage, for example, sectors.

The methods and systems are configured to utilize single-sector atomic writes of relatively low latency NVM storage devices, e.g., SSDs, to avoid buffering and log-structured storage without degrading performance. Relatively low latency NVM storage devices may be byte-accessible, thus, access times may not include latencies associated with log-structured storage. Relatively low latency NVM technology has relatively fast access times, e.g., relatively low random write or random read latencies. For example, a relatively low random access latency for writing or reading a sector may be on the order of ten microseconds (μsec). In another example, the relatively low memory access latency may be on the order of 100 μsec. The write latency may be determined from a perspective of an application. In other words, the latency may include a time interval that begins with submitting a request for a write or read and ends when associated data is resident on the NVM storage device or has been provided to the requesting application, respectively. For example, such relatively low latency byte-accessible NVM technology may include, but is not limited to, magnetoresistive memory (MRAM), phase change memory (PCM, PRAM), phase change memory and switch (PCMS), resistive memory, ferroelectric memory (F-RAM, FeRAM), spin-transfer torque memory (STT), thermal assisted switching memory (TAS), millipede memory, floating junction gate memory (FJG RAM), battery-backed RAM, etc. Log-structured storage and its associated overhead may be avoided when utilizing such byte-accessible, relatively low latency NVM technology. Methods and systems consistent with the present disclosure may be used with higher latency NVM but, as latency increases, benefits of the method and systems may decrease until log-structured storage may be at least as fast.

In some embodiments, a method to look up an address included in unsorted B-tree leaf nodes may be implemented using SIMD (single instruction, multiple data) operations. For example, a PCMPGTQ (compare packed data for greater than) SIMD instruction, included in an SSE4 instruction set for Intel® Architecture processors may be utilized in look up address operations, as described herein. In other words, parallel (e.g., vector) processing may be implemented, as described herein.

In some embodiments, a plurality of free lists within a shared address space may be managed. One or more of the plurality of free lists within the shared address space may be assigned to a respective processor, core and/or thread. The processor, core and/or thread may then be configured to add and/or remove extents from its assigned free list(s). Thus, lock contention associated with accessing a free list may be avoided.

Thus, an implementation consistent with the present disclosure may resemble a simple file system configured to store a single, large sparse file. Allocated space may include one or more data extent(s), one or more leaf node(s) that provide mapping between host address space and device address space and a tree structure relating index nodes to leaf nodes. Data extents correspond to contiguous mappings of host LBA ranges to device LBA ranges. Free device LBAs may be managed by a heap-style (i.e., pool of available free memory) free list.

FIG. 1 illustrates a system block diagram of a computing system 100 consistent with several embodiments of the present disclosure. Computing system 100 may include, but is not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.) and/or a feature phone.

System 100 includes a host computing device 102 and NVM storage device, e.g., SSD 104, and may include one or more peripheral device(s) 106. Host 102 includes a processor 110, a chipset 112 and a memory 114. Processor 110 may include one or more processing unit(s) (e.g., processor(s)

and/or core(s)) and is configured to perform operations associated with computing device 100, as described herein. Processor 110 may be configured to execute one or more threads. Chipset 112 may include an SSD interface 113. Chipset 112 and/or SSD interface 113 are configured to couple processor 110 to NVM storage device 104 and/or peripheral device(s) 106. SSD interface 113 may be configured to communicate with NVM storage device 104 and/or one or more peripheral device(s) 106 using one or more serial bus communication protocols, e.g., PCIe (Peripheral Component Interconnect Express), SAS (Serial Attached SCSI (Small Computer System Interface)), SATA (Serial ATA (Advanced Technology Attachment)), etc. Peripheral device(s) 106 may include, for example, user interface device(s) including a display, a touch-screen display, printer, keypad, keyboard, etc., communication logic, wired and/or wireless, other storage device(s) including hard disk drives, solid-state drives, removable storage media, etc. It should be noted that system 100 is simplified for ease of illustration and description.

Memory 114 may include cache and/or random access memory. Memory 114 is configured to store one or more application(s) 120, an OS 122 and an application library 124. Memory 114 is configured to store indirection logic 140 that includes NVM primitives 142. The application(s) 120 may be configured to initiate memory access operations related to NVM storage device 104. For example, application(s) 120 may include a database application. Memory access operations include read, write, discard and verify. Application library 124 may include one or more application programming interfaces (APIs) and/or other applications that may be utilized by application(s) 120 to facilitate operations of application(s) 120.

OS 122 may include file system 130 and block device driver 132. File system 130 is configured to manage file storage and/or retrieval for host computing device 102. Block device driver 132 is configured to manage input and output (I/O) operations between host computing device 102 and, e.g., NVM storage device 104. The indirection logic 140 and/or NVM primitives 142 may be included in OS 122, block device driver 132 and/or application library 124. Including indirection logic 140 and NVM primitives 142 in application library 124 is configured to facilitate direct I/O by application(s) 120. The indirection logic 140 is configured to receive one or more host LBAs and possibly data, map the host LBA(s) to device LBA(s) and to provide the device LBA(s) to NVM storage device 104 using one or more of NVM primitives 142, as described herein. NVM storage device 104 may then map and/or translate the received device LBA(s) to physical memory addresses and if the memory access is a write operation, store associated data.

The indirection logic 140 is configured to receive memory access requests from one or more of application(s) 120. The requests may be received via OS 122 and/or directly via application library 124. The memory access requests may include reading, writing, deleting and/or verify operations related to memory location(s) identified by one or more host LBAs. The indirection logic 140 is configured to allocate one or more sector(s) that are identified by device LBA(s) and map host LBA(s) to allocated device LBA(s) for write operations. If the write operation is targeted to a host LBA associated with existing data, then the write operation may include a later discard of the existing data after a commit of the new data, as described herein. In other words, write operations are copy-on-write. The indirection logic 140 is further configured to discard (i.e., return to free list) device LBA(s) related to deleted data. The indirection logic 140 is configured to utilize NVM primitives 142 when performing memory access operations.

The NVM primitives 142 include atomic multi-write, atomic write, sparse addressing, discard, verify, atomic discard and atomic multi-discard. The atomic multi-write and atomic write primitives are configured to write one or more sector(s) from host LBA space to device LBA space, as a transaction. The sector(s) may be dis-contiguous. In an atomic write operation, wholly all or none of the data becomes written. Thus, if an interruption (e.g., power loss) occurs during the operation the existing old data remains valid. Other concurrent reads from and/or writes to one or more of the same host LBAs is ordered either before or after the entire transaction. In sparse addressing, the host LBA space is larger than device LBA space and at least some host LBAs may remain unmapped. A sparse addressing primitive is configured to dynamically map an unmapped host LBA to a device LBA when the host LBA is written. Discard includes explicitly unmapping a host LBA from a device LBA. Verify is configured to allow an application to determine whether a selected LBA is mapped or unmapped. The atomic multi-discard and atomic discard primitives are configured to perform a discard as a transaction that either discards wholly all or none of the data, similar to the atomic multi-write and atomic write primitives.

Thus, a system and method consistent with the present disclosure are configured to provide indirection, mapping the host LBA to a device LBA. A leaf node related to a search tree is configured to contain the host LBA, device LBA and an associated length. The underlying implementation may then be abstracted from an application while allowing the indirection logic 140 and NVM primitives 142 to be implemented in one or more of device driver 132, an OS 122 I/O layer and/or an application library 124 (e.g., for applications using direct I/O). The NVM storage device 104 may then translate the device LBAs to physical memory address(es) and store the data to the target physical memory address.

NVM storage device 104 includes a drive controller 150, non-volatile physical memory 152, a host interface 156 and may include a cache memory 158. Drive controller 150 is configured to receive device LBAs and associated data (if any) from indirection logic 140 via, for example, chipset 112, SSD interface 113 and host interface 156. For example, the non-volatile physical memory 152 may include relatively low latency byte-accessible non-volatile memory technology that includes, but is not limited to, magnetoresistive memory (MRAM), phase change memory (PCM, PRAM), phase change memory and switch (PCMS), resistive memory, ferroelectric memory (F-RAM, FeRAM), spin-transfer torque memory (STT), thermal assisted switching memory (TAS), millipede memory, floating junction gate memory (FJG RAM), battery-backed RAM, etc., as described herein. Drive controller 150 includes a flash translation layer (FTL) 154 configured to translate device LBAs to physical memory addresses (PMAs). Drive controller 150 may then be configured to map device LBAs to PMAs and to store received data to PMAs in non-volatile physical memory 152 that correspond to device LBAs.

Thus, indirection logic 140 may receive a memory access request from one or more of application(s) 120 that includes host LBA(s) and may include one or more sector(s) of associated data (or pointers) to the sector(s) associated data. Indirection logic 140 may then traverse a B+-tree utilizing the host LBA(s) as indexes. Indirection logic 140 may allocate a data extent in device address space that corresponds to a length of the sector(s) of data and provide a mapping from host LBA(s) to device LBA(s). The mapping may be contained in a leaf node. NVM storage device 104 may receive the device LBA(s) and associated data from indirection logic 140 and may then translate the device LBA(s) to physical memory addresses and store the associated data. Such operations may be performed for one or more sectors of data in response to the memory access request without waiting for additional sectors of data.

Figure 2:
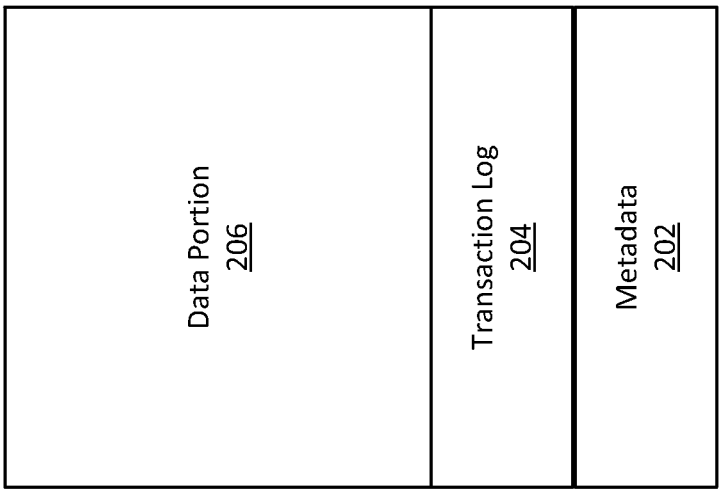
FIG. 2 illustrates an example storage layout for device logical block address (LBA) space consistent with various embodiments of the present disclosure.

FIG. 2 illustrates an example storage layout 200 for device LBA space, consistent with various embodiments of the present disclosure. Device LBA space is related to non-volatile physical memory 152 of NVM storage device 104. In other words, drive controller 150 may map or translate device LBA space to non-volatile physical memory 152 PMA space where the actual storage may occur. Device LBA space 200 includes three regions: metadata 202, a transaction log 204 and a data portion 206. Metadata 202 includes fixed fields related to an indirection state, as described herein. Transaction log 204 is configured to include records related to allocating device memory ("allocations") and freeing device memory ("frees"). Transaction log 204 is configured to store one or more records related to a transaction identifier (ID), temporarily, configured to support atomic operations. Data portion 206 may include device LBAs related to data extents and index nodes, as described herein. The extents are contiguous mappings of host LBA ranges to device LBA ranges. The data extents may be indexed by host LBA in a tree structure. The tree structure may include B-tree, B+-tree and/or variations thereof. Storage layout 200 is configured as a relatively simple file system configured to store a relatively large sparse file. Modifications may be performed as copy-on-write, as described herein. Free device LBAs i.e., free extents, may be managed by a heap-style free list.

Figure 3:
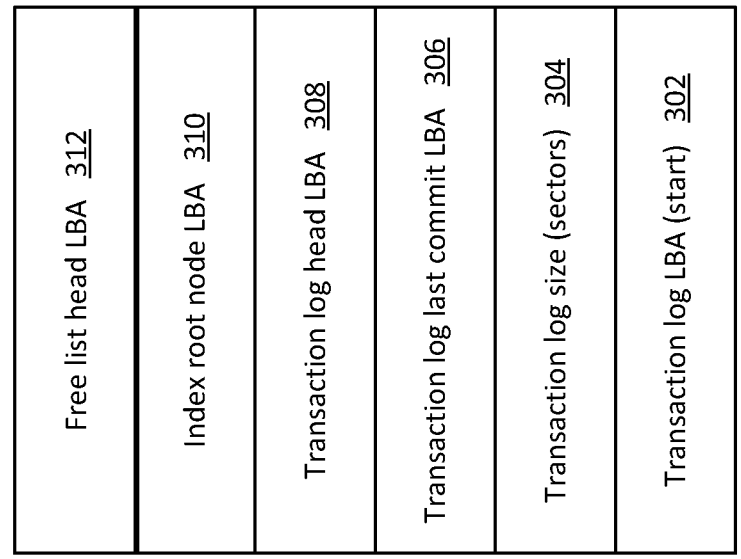
FIG. 3 illustrates an example metadata layout for the storage layout of FIG. 2 consistent with various embodiments of the present disclosure.

FIG. 3 illustrates an example metadata layout 300 for the device LBA space 200 of FIG. 2 consistent with various embodiments of the present disclosure. Metadata 300 includes a transaction log LBA (start) 302, a transaction log size 304, a transaction log last commit LBA 306, a transaction log head LBA 308, an index root node LBA 310 and a free head list LBA 312. The transaction log LBA 302 is configured to include a starting device LBA of the transaction log. The transaction log size 304 is configured to include the transaction log size in sectors. The transaction log last commit LBA 306 is configured to include a location in the transaction log 204 of a most recent "commit" record, as described herein. The transaction log head LBA 308 is configured to include a location of a last entry written to the transaction log 204. The index root node LBA 310 is configured to include a device LBA corresponding to a root node of a search tree, as described herein. The free head list LBA 312 is configured to include a device LBA that corresponds to a head of a free list. The free list is related to unallocated device LBAs in the device LBA space. In a search, other free list extents may be reached from the free head list LBA 312.

Indirection logic 140 is configured to maintain and/or update metadata 202 and transaction log 204. Metadata 202 and/or transaction log 204 may be updated in relation to a memory access request from application(s) 120. The memory access request may include writing to, reading from, discarding and/or verifying memory cell(s) corresponding to one or more host LBAs. Metadata 202, 300 may be updated when a memory access request results in a change to a parameter included in metadata 202, 300. For example, free list head LBA 312 may change in response to an allocation that allocates one or more device LBA(s) and/or a discard that frees one or more device LBA(s).

The transaction log 204 may be utilized to support atomic operations that complete when changes to stored data and/or index nodes commit. The transaction log 204 is configured to provide a checkpoint for a most recent transaction. Transaction log 204 is configured to include one or more records related to a transaction ID. If a memory access operation is interrupted, the record(s) may be utilized to return to a state prior to the memory access operation. Indirection logic 140 is configured to add, update and/or delete records from the transaction log 204 during and/or after a memory access operation. In response to a memory access request, indirection logic 140 may generate a unique transaction identifier (ID) associated with the memory access. Transaction log 204 includes one or more records associated with each transaction ID. Each record includes a log entry type and one or more associated parameters. Transaction log 204 entry types include "allocate", "free intent", "commit" and "free".

Allocate indicates that an extent has been removed from the free list. Parameters associated with allocate include start LBA, allocate length, new free list LBA. Start LBA identifies a start device LBA of the extent being allocated. Allocate length corresponds to a number of sectors in the allocated extent. New free list head LBA corresponds to the new free list head device LBA after the extent has been allocated. In other words, the existing head has been removed with the allocation.

Free intent indicates that an extent should be returned to the free list. Free intent parameters include free intent LBA and free intent length. Free intent LBA corresponds to (i.e., identifies) a device LBA of the extent that should be returned to the free list. Free intent length corresponds to a number of sectors in the extent that should be freed. For example, an extent may be freed in response to a discard. In another example, an extent may be freed on a write. In this example, since write operations are copy-on-write device LBA(s) corresponding to old data, if any may be freed (if the write completes successfully). Commit indicates that a transaction is complete. Commit parameters include a root node LBA. Root node LBA is configured to provide a new device LBA for the new root of the search tree, if the root node has changed as a result of the memory access operations associated with the transaction ID. Free indicates that an extent has been returned to the free list. Free parameters include free LBA and free length. Free LBA corresponds to the device LBA of the extent returned to the free list and free length corresponds to the length, in sectors, of the extent returned to the free list.

For example, during a write operation to a device LBA (or range of device LBAs), one or more sectors may be allocated for storage of data associated with the write operations. A unique transaction ID may be associated with the write operation and included in the transaction log 204. An associated record in the transaction log 204 may then include entry type allocate and associated allocate parameters. The new free list head LBA may then correspond to a resulting device LBA after an extent associated with the write operation has been allocated. Allocate device LBA parameter may then correspond to a start device LBA of the allocated extent and length corresponds to the extent length in sectors. Indirection logic 140 may be configured to update the parameters in the transaction log.

If the write operation includes previously written device LBAs (old data), indirection logic 140 may also create a free intent record related to the device LBA associated with the old data. If the write operation is interrupted and does not complete, then indirection logic 140 is configured to "roll back" to the old data based, at least in part, on the transaction log 204. If the write operation is interrupted after completion but before freed extents or nodes have been returned to the free list, the indirection logic 140 is configured to "roll forward" and resume returning freed extents and nodes to the free list, based, at least in part, on the transaction log 204. The portion of transaction 204 that corresponds to transaction ID may exist during the memory access operation and may be deallocated after the operations associated with the transaction ID have completed successfully. In other words, elements of the transaction log may be temporary.

Data portion 206 includes a free list and regions of index nodes, leaf nodes and/or allocated extents. Index nodes include a root node and internal node(s) and may include a plurality of leaf nodes. Initially, data portion 206 may correspond to one single, large free list entry. In other words, initially data portion 206 may not include index nodes and allocated extents. In operation, index nodes may be allocated and/or updated and one or more leaf nodes and/or data extents may be allocated. A leaf node and associated data extent may be allocated in response to a write request to a contiguous range of "new" host LBAs. A free extent may be allocated with a size that corresponds to a size of the leaf node plus a size of the data extent. The leaf node may be updated, a new data extent allocated and the old extent marked "free intent", in response to an update request associated with the host LBA. The old data extent may then be freed, if the memory access operation completes successfully. The leaf node and new data extent may both be freed in response to a discard (i.e., delete) request.

Initially, data portion 206 may include one free list entry. Each free list entry includes a length parameter and a parameter next device LBA in a respective first sector. The length parameter corresponds to a number of sectors in the associated free list portion ("item"). The parameter next LBA corresponds to a device LBA of a next item in the free list. Thus, the initial free list entry may include a first device LBA that is adjacent (in device LBA space) a last device LBA of the transaction log 204.

In operation, when a leaf node and/or extent are allocated, affected free list entries may be updated based, at least in part, on a range of device LBAs allocated and a next free device LBA. A respective free list entry may be included in a first sector of each range of contiguous free device LBA(s) i.e., free extents. When a leaf node and/or extent are freed, a free list entry may be written to a first sector of the leaf node and/or the data extent. For example, when an extent and/or index node are freed, the extent and/or index node become a new entry in the free list. The free list head LBA 312 may then be written as the next device LBA parameter in the entry. The device LBA of the new entry is then written to metadata 202 as the new free list head LBA 312.

The free list is a "heap-style" free list in that it resembles the free list of a heap memory manager for volatile memory. During operation, items may be added to and removed from the free list. The free list may become fragmented and an entry may be too small to store data corresponding to a contiguous range of host LBAs. The data may then be broken up into a plurality of extents sufficient to fit the data into free list entries. A corresponding leaf node may then include the plurality of mappings with one mapping for each dis-contiguous extent.

Figure 4:
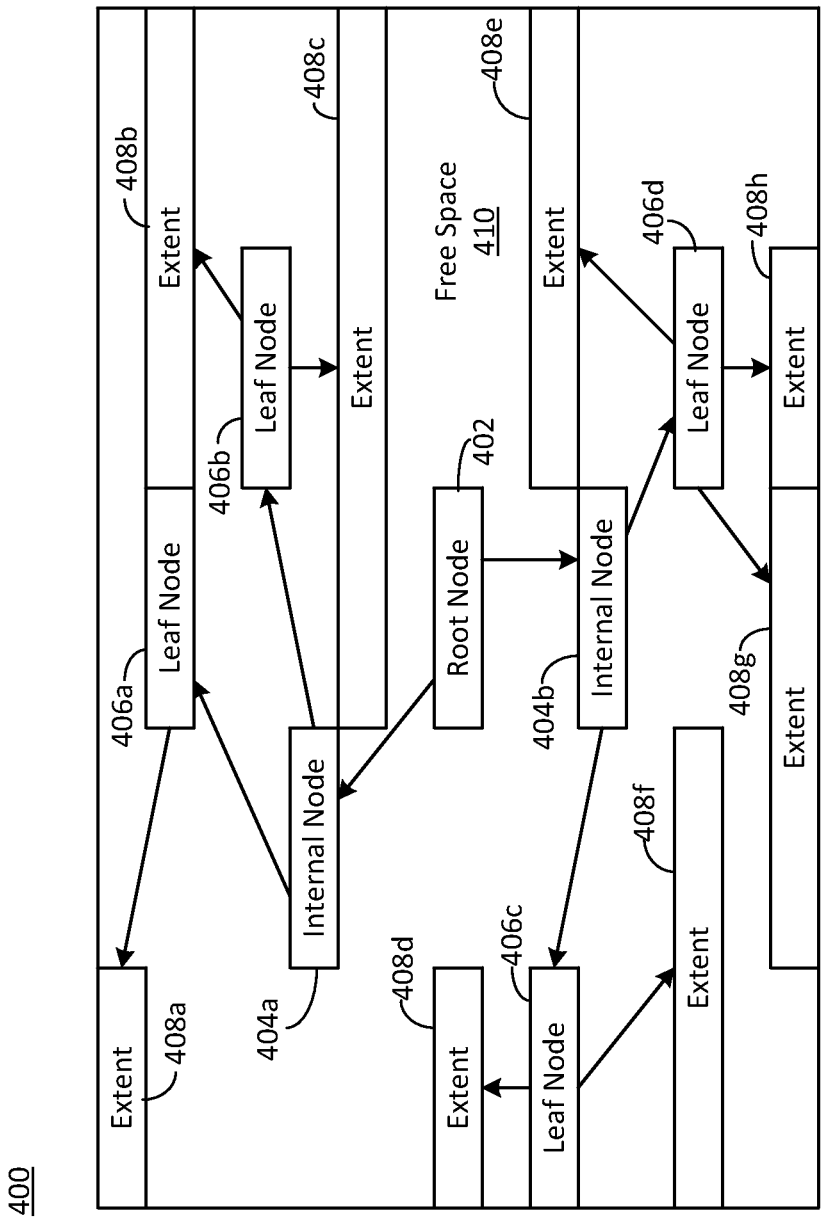
FIG. 4 illustrates an example data portion with allocated index nodes, data extents and free space consistent with one embodiment of the present disclosure.

FIG. 4 illustrates an example data portion 400 with allocated index nodes (including leaf nodes), data extents and free space 410 consistent with one embodiment of the present disclosure. Free list entries are not shown for ease of illustration. Example data portion 400 includes a root node 402, two internal nodes 404a, 404b, four leaf nodes 406a, 406b, 406c, 406d and eight extents 408a, . . . , 408h. In this example, root node 402 points to the two internal nodes 404a, 404b. In this example, each internal node 404a, 404b points to two leaf nodes 406a and 406b and 406c and 406d, respectively. Each leaf node points to one or more respective extents.

Both index nodes 402, 404a, 404b, 406a, 406b, 406c, 406d and data extents 408a, . . . , 408h may be allocated from a same free list, as described herein. Maintaining index nodes and data in separate contiguous portions of free space may be avoided for relatively low latency NVM as described herein. Root node 402 and internal nodes 404a, 404b may each include indexes and pointers that correspond to at least a portion of a search tree, e.g., a B+-tree. The indexes may be related to host LBAs and the pointers may be related to device LBAs. The leaf nodes are configured to contain a plurality of parameters that map ranges of host LBAs to ranges of device LBAs, e.g., data extents. For example, leaf nodes may include a host LBA, a corresponding device LBA and a length in sectors, e.g., {host LBA, device LBA, length}.

For example, in operation, a look up related to a query host LBA, includes traversing the tree to find a leaf node with a largest host LBA that is less than or equal to the query host LBA. An associated length of the leaf node may then be evaluated to determine whether the allocated range of host LBAs includes the query host LBA. If the query host LBA is included in the range of LBAs, an associated device LBA may then be selected. A memory access operation may then proceed. Atomic operations that span a plurality of host LBA ranges may be accomplished by grouping the operations into transactions. In other words, atomic operations are not limited to contiguous host LBAs or contiguous device LBAs.

Thus, a data portion may include a plurality of index nodes, a plurality of leaf nodes and a plurality of data extents. The data portion may further include one or more free extents. A memory access operation may include traversing a search tree using a lookup host LBA as search index. A leaf node may then be selected based, at least in part, on a stored host LBA included in the leaf node and based, at least in part, on an associated length. For example a leaf node may be selected if the lookup host LBA is included in a range of host LBAs defined by the stored host LBA and the length. A corresponding device LBA may then be identified. In other words, the leaf node is configured to provide mapping from a lookup host LBA to the identified device LBA. In operation, the index nodes, leaf nodes and extents may be allocated from a same free list. The leaf nodes and/or extents may be freed from the free list.

In an embodiment, a traversal of a search tree may be facilitated by vector processing. For example, processor 110 may be configured for vector processing and indirection logic 140 may be configured to manage traversal of the search tree using vector processing. Vector processing includes single instruction, multiple data (SIMD). In other words, an operation may be performed on a plurality of elements in parallel. The elements may be included in, for example, a vector.

The search tree includes a B+-tree, as described herein. Indexes in the search tree include and/or are related to host LBAs. A look up operation is configured to determine whether a lookup (i.e., query) host LBA is included in a leaf node. The lookup host LBA is included in a leaf node if the lookup host LBA is greater than or equal to a stored host LBA and less than the stored host LBA plus an associated length. If the lookup host LBA is included in a leaf node, then a corresponding device LBA has been allocated and has not been freed. If the look up operation was included in a verify operation then the verify operation may be successful. If the lookup host LBA is not included in the leaf node, then a corresponding device LBA has not been allocated and/or has been freed. In this case, an associated verify operation may fail or may confirm that the corresponding device LBA has been freed.

In this embodiment, contents of one or more leaf nodes may be configured as a plurality of vectors for a look up operation. A first vector may include a plurality of stored host LBAs and a second vector may include the plurality of corresponding lengths. A lookup vector may be formed of the plurality of lookup hosts LBAs. The lookup vector may then be compared to the first vector and a result of the comparison may be stored in a first map vector. For example, for each lookup host LBA-stored host LBA comparison, the first map vector may include a first value (e.g., set) if the stored host LBA is less than or equal to the lookup LBA and may include a second value (e.g., cleared) otherwise.

A max LBA vector may then be formed by summing corresponding elements of the first vector and the second vector (i.e., adding stored host LBA and corresponding length to determine a range of host LBAs associated with an extent). The lookup vector may then be compared to the max LBA vector and a result of the comparison may be stored in a second map vector. For example, for each lookup host LBA-max LBA comparison, the record map vector may include the first value if the max LBA is greater than the lookup host LBA and may include the second value otherwise.

The first map vector and the second map vector may then be compared. For each element in the first map vector and corresponding element in the second map vector, if the lookup host LBA is greater than or equal to the stored host LBA (e.g., first map vector element corresponds to the first value) and the lookup host LBA is less than the max host LBA (e.g., the second map vector element corresponds to the first value) then the lookup host LBA corresponds to a host LBA mapped by the leaf node that contained the stored host LBA.

Thus, look ups of a plurality of lookup (i.e., query) host LBAs may be performed in parallel. Such parallel processing may increase throughput by decreasing an amount of time for traversal of the search tree.

Figure 5:
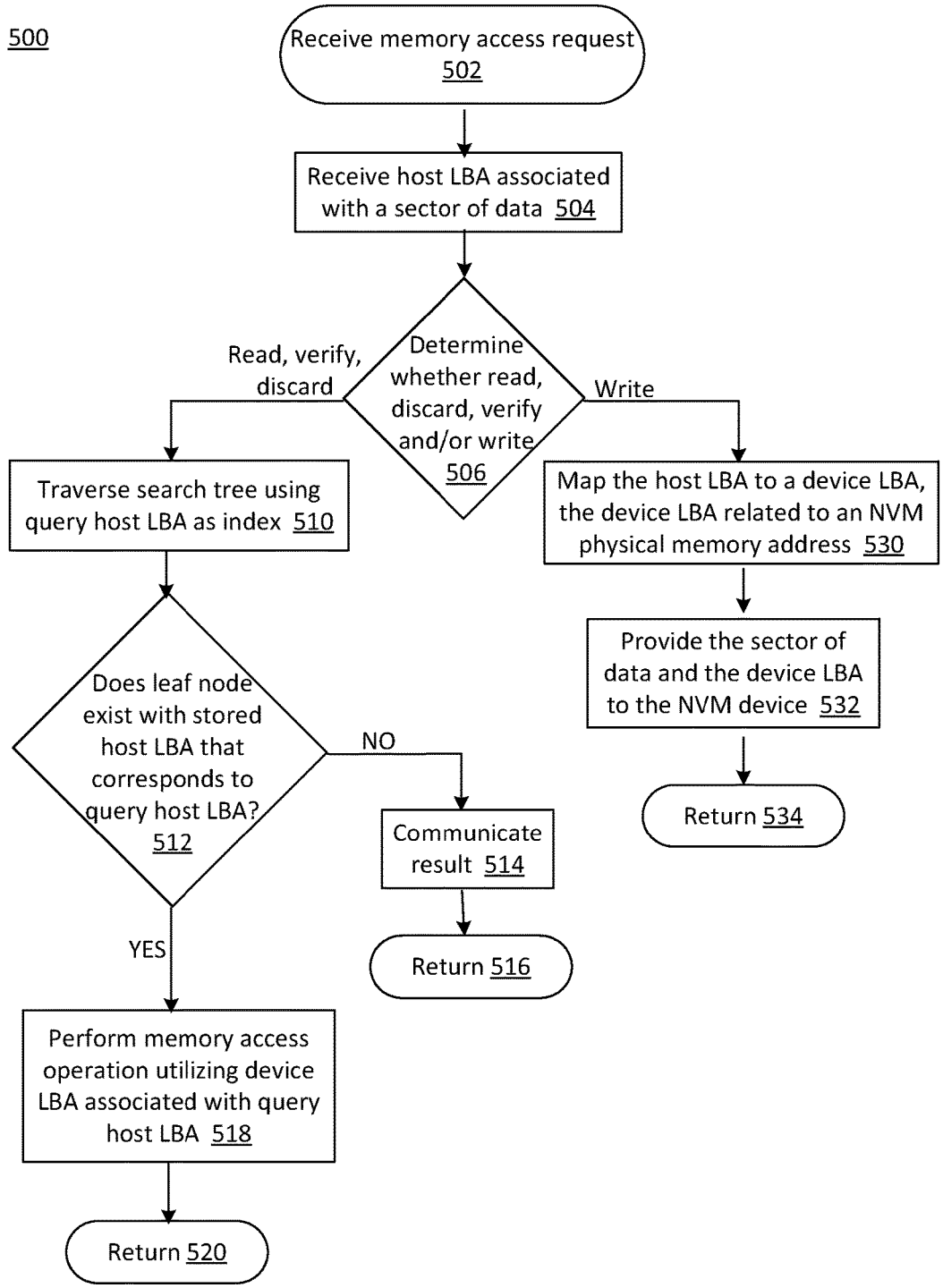
FIG. 5 is a flowchart of memory access operations according to various embodiments of the present disclosure.

FIG. 5 is a flowchart 500 of memory access operations according to various embodiments of the present disclosure. In particular, the flowchart 500 illustrates receiving a memory access request by, for example, indirection logic 140, determining whether the memory access request is a read, discard, verify or write operation and then performing the host computing device portion of the operation. The operations may be performed, for example, by host computing device 102 of FIG. 1.

Operations of this embodiment may begin with receiving a memory access request 502. For example, the memory access request may be received from application(s) 120. A host LBA associated with a sector of data may be received at operation 504. Whether the memory access request corresponds to read, discard, verify and/or write request may be determined at operation 506. If the memory access operation corresponds to a read, discard and/or verify request, a search tree may be traversed using the query host LBA as index at operation 510. Whether a leaf node exists that includes a stored host LBA that corresponds to the query host LBA may be determined at operation 512. If such a leaf node does not exist, a result may be communicated at operation 514. For example, the result may verify that a device LBA has been discarded. In another example, the result may correspond to an error. Program flow may then return at operation 516. If such a leaf node does exist, operation 518 may include performing the memory access operation utilizing a device LBA associated with the query host LBA. Program flow may then return at operation 520.

If the memory access operation corresponds to a write request, the host LBA may be mapped to a device LBA that is related to an NVM physical memory address at operation 530. Operation 532 may include providing the sector of data to the NVM storage device. The NVM storage device may then translate the device LBA into the physical memory address and store the sector of data. Program flow may return at operation 534.

Thus, a memory access request may include a host LBA. A write operation may include mapping the host LBA to a device LBA. The device LBA and associated sector of data may then be provided to an NVM storage device for storage. Waiting for a segment of data that includes a plurality of sectors may be avoided.

Figure 6:
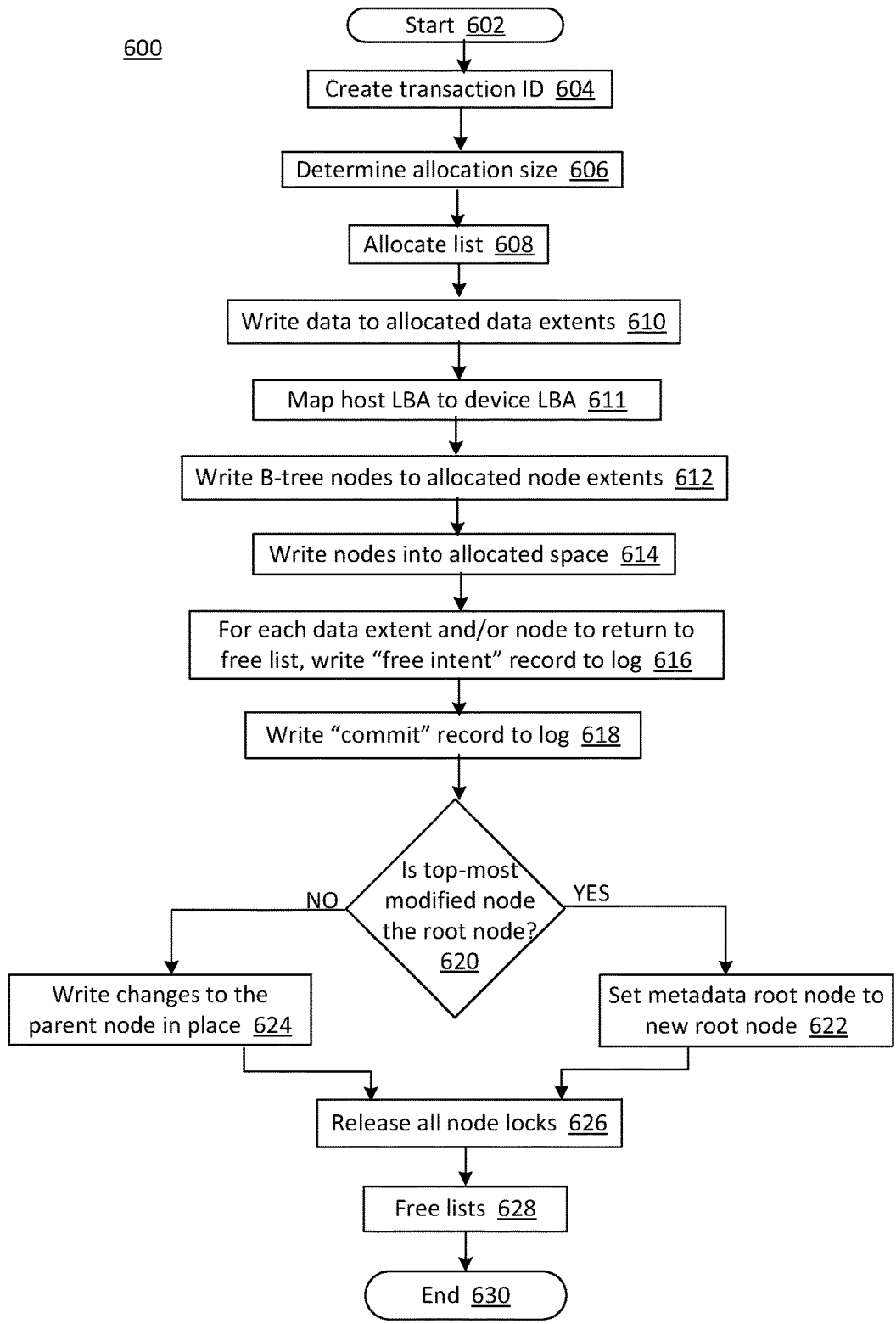
FIG. 6 is a flowchart of write and discard operations according to various embodiments of the present disclosure.

FIG. 6 is a flowchart 600 of write and discard operations according to various embodiments of the present disclosure. The operations may be performed, for example, by host computing device 102 and/or NVM storage device 104 of FIG. 1.

Operations of this embodiment may begin at start 602. Operation 604 includes creating a transaction ID. The transaction ID may be included in a transaction log. Allocation size may be determined at operation 606. Allocation size may include a leaf node and a data extent or a data extent, as described herein. Operation 608 includes allocating a list. Operation 608 is configured to allocate extents that total allocation size and to update the free list, as described herein. Data may be written to allocated data extents at operation 610. Host LBA(s) associated with the data may be mapped to device LBA(s) at operation 611. The mappings may include length(s) of associated data extent(s). B+-tree nodes may be written to allocated node extents at operation 612. Nodes may be written into allocated space at operation 614. Nodes include modified and/or new leaf nodes and internal nodes and may include a root node. Nodes may be written into allocated space in physical memory of an NVM storage device by, e.g., a device controller. For each data extent and/or node to return to free list, a "free intent" record may be written to the transaction log associated with the transaction ID at operation 616. For example, a discard operation and/or a write operation that updates existing stored data and its associated discard of "old" data may result in allocated data extents and/or leaf nodes that are to be freed (if the transaction completes successfully). The free intent entry type may remain until the transaction completes. Operation 618 may include writing a "commit" record to the transaction log. The commit log entry is configured to indicate that the write/discard transactions (operations) completed successfully.

Whether a top-most modified node is the root node may be determined at operation 620. For example, B+-tree nodes may be modified in response to a rebalancing of the search tree initiated by addition(s) and/or deletion(s) of leaf node(s). If the top-most modified node is the root node, a metadata root node may be set to a new root node at operation 622. If the top-most modified node is not the root node, changes may be written to the parent node in place at operation 624. In other words, such node updates are not copy-on-write operations. All node locks may be released at operation 626. Lists may be freed at operation 628. A free list corresponds to free extents and an extent list corresponds to extents marked free intent. The lists may be locked during a transaction. Program flow may then end at operation 630.

Figure 7:
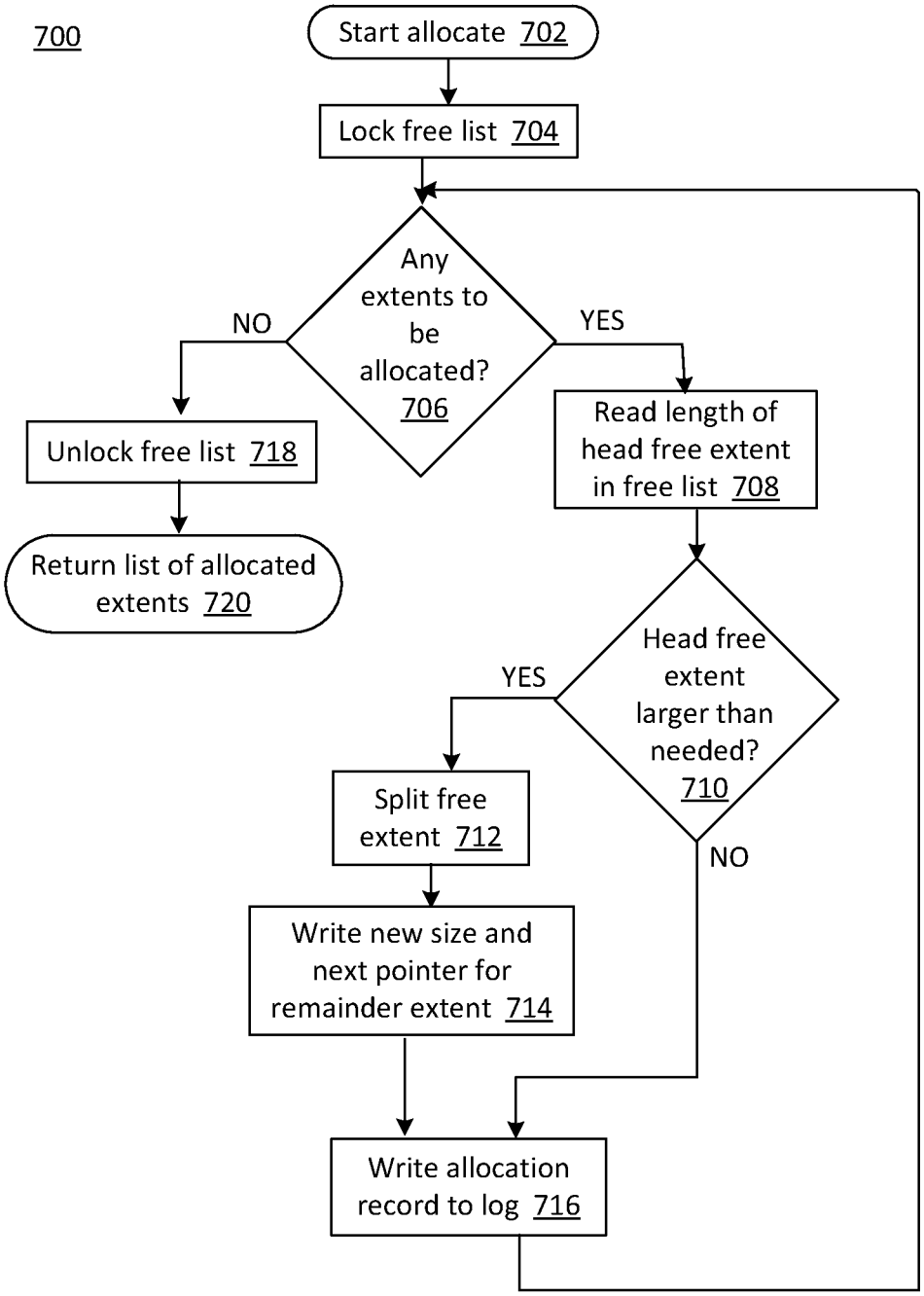
FIG. 7 is a flowchart of allocate operations according to various embodiments of the present disclosure.

FIG. 7 is a flowchart 700 of allocate operations according to various embodiments of the present disclosure. In particular, the flowchart 700 illustrates allocating extents in device memory. Flowchart 700 is one example of operation 608 of FIG. 6. The operations may be performed, for example, by host computing device 102 of FIG. 1. The operations of flowchart 700 may begin with operation 702, start allocate. A free list may be locked at operation 704. Locking is configured to prevent other operations from accessing and possibly changing the free list while the operations of flowchart 700 are occurring.

Whether there are any extents to be allocated may be determined at operation 706. If there are not extents to be allocated, program flow may proceed to operation 718. If there are extents to be allocated, a length of a head free extent in the free list may be read at operation 708. Whether the head free extent is larger than needed may be determined at operation 710. If the head extent is larger than needed, the extent may be split at operation 712. For example, the free extent may be split into an allocated extent and a remainder extent. A new size and a next pointer for the remainder extent in a new head extent may be written at 714. Operation 716 includes writing an allocation record to the transaction log. Program flow may then proceed to operation 706. Thus, operations 706, 708, 710, 716 and possibly 712 and 714 may be repeated until there are no more extents to be allocated. The free list may be unlocked at operation 718. A list of allocated extents may be returned at operation 720. Thus, one or more extents may be allocated from the free list. The extents may include data extents and/or node extents, as described herein.

Figure 8:
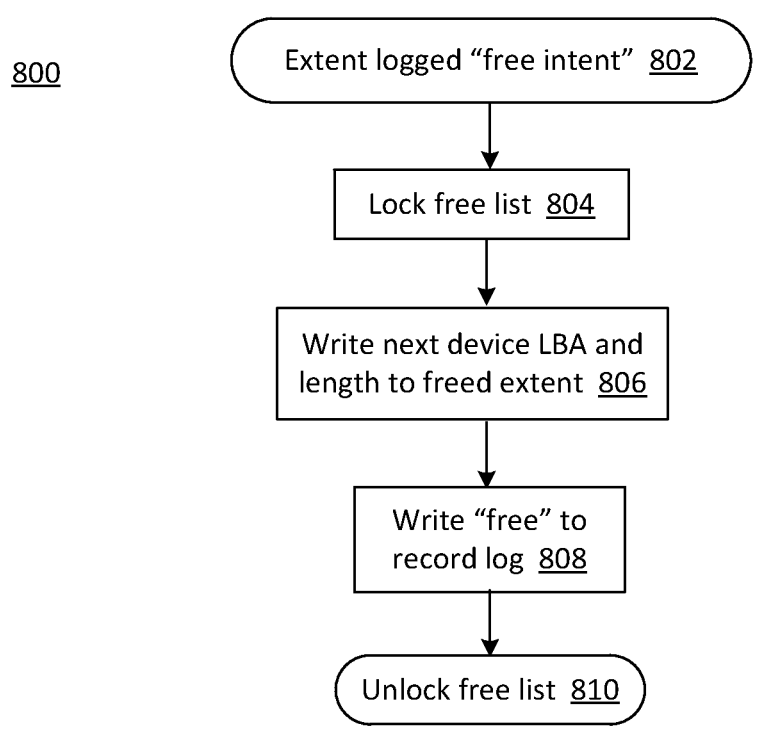
FIG. 8 is a flowchart of freeing operations according to various embodiments of the present disclosure.

FIG. 8 is a flowchart 800 of freeing operations according to various embodiments of the present disclosure. In particular, the flowchart 800 illustrates freeing extents in device LBA space. Flowchart 800 is one example of operations to free extents in response to operation 616 of FIG. 6. In other words, flow chart 800 is configured to free extents marked "free intent". The operations may be performed, for example, by host computing device 102 of FIG. 1. The operations of flowchart 800 may be initiated in response to a transaction log entry of "free intent" related to an extent at operation 802. The free list may be locked at operation 804. Operation 806 includes writing a next device LBA and a length to the freed extent. Operation 808 may include writing "free" to a record in the transaction log. The free list may be unlocked at operation 810.

Figure 9:
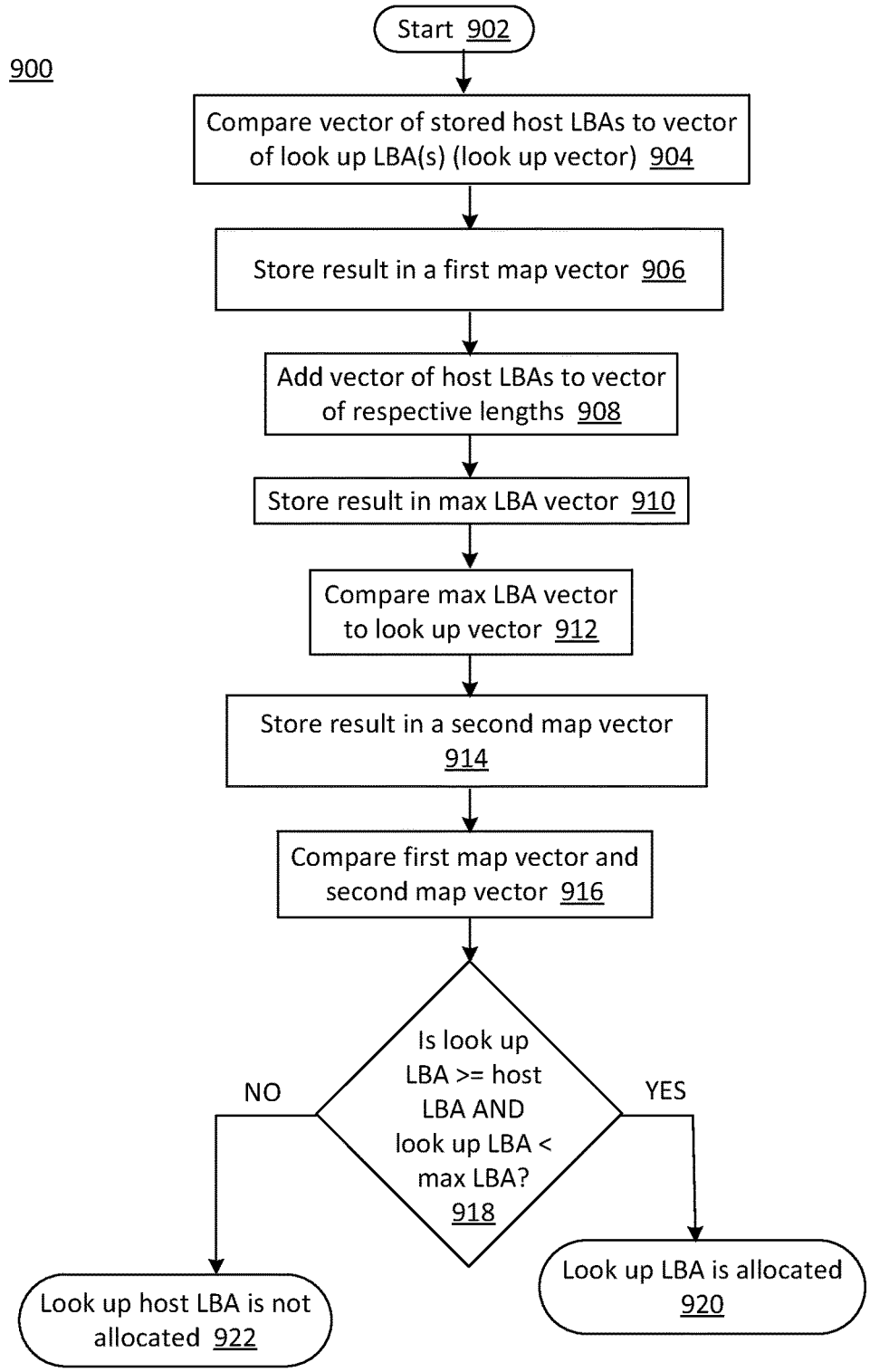
FIG. 9 is a flowchart of lookup operations using SIMD (single instruction, multiple data) according to various embodiments of the present disclosure.

FIG. 9 is a flowchart 900 of look up operations using SIMD (single instruction, multiple data) according to various embodiments of the present disclosure. In particular, the flowchart 900 illustrates performing look up operations by a processor configured to execute SIMD instructions, e.g., a vector processor. The operations may be performed, for example, by host computing device 102 of FIG. 1. The operations of flowchart 900 may begin at start 902. Operation 904 may include comparing a vector of stored host LBAs to vector of lookup LBA(s) (lookup vector). A result of the comparison may be stored in a first map vector at operation 906. For example, each result in the first map vector may correspond to a first value if a respective stored host LBA≤a respective lookup host LBA (i.e., query host LBA) and a second value otherwise. Operation 908 may include adding a vector of stored host LBAs to a vector of respective lengths. A result of operation 908 may be stored in a max LBA vector at operation 910. Operation 912 includes comparing the max LBA vector to the lookup vector. Operation 914 may include storing a result of the comparison of operation 912 in a second map vector. The first map vector and second map vector may be compared at operation 916.

Whether a respective lookup host LBA is greater than or equal to a respective stored host LBA and the respective lookup host LBA is less than a respective max host LBA may be determined at operation 918. In other words, the first map vector and second map vector may be compared. If the respective lookup host LBA is greater than or equal to the respective stored host LBA and the respective lookup host LBA is less than the respective max host LBA, the respective lookup host LBA is allocated 920. In other words, the lookup host LBA corresponds to a stored host LBA. If the respective lookup host LBA is less than the respective stored host LBA and/or the respective lookup host LBA is greater than the respective max host LBA, then the lookup host LBA is not allocated 922.

Figure 10:
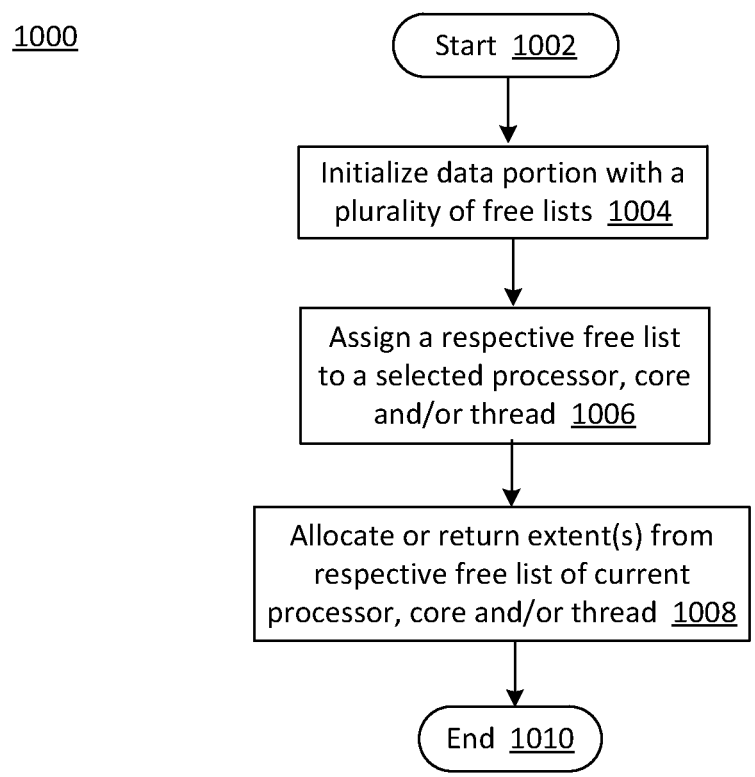
FIG. 10 is a flowchart of operations for a plurality of free lists according to one embodiment of the present disclosure.

FIG. 10 is a flowchart 1000 of operations for a plurality of free lists according to one embodiment of the present disclosure. In particular, the flowchart 1000 illustrates management of a plurality of free lists, each free list configured to be maintained by a respective processor, core and/or thread. The operations may be performed, for example, by host computing device 102 of FIG. 1. The operations of flowchart 1000 may begin with start 1002. Operation 1004 includes initializing a data portion with a plurality of free lists. A respective free list may be assigned to a selected processor, core and/or thread at operation 1006. Operation 1008 includes allocating or returning extent(s) from a respective free list of the current processor, core and/or thread. Program flow may then end at operation 1010.

While the flowcharts of FIGS. 5 through 10 illustrate operations according various embodiments, it is to be understood that not all of the operations depicted in FIGS. 5, 6, 7, 8, 9 and/or 10 are necessary for other embodiments. In addition, it is fully contemplated herein that in other embodiments of the present disclosure, the operations depicted in FIGS. 5, 6, 7, 8, 9 and/or 10, and/or other operations described herein may be combined in a manner not specifically shown in any of the drawings, and such embodiments may include less or more operations than are illustrated in FIGS. 5, 6, 7, 8, 9 and/or 10. Thus, claims directed to features and/or operations that are not exactly shown in one drawing are deemed within the scope and content of the present disclosure.

OS 122 may be configured to manage system resources and control tasks that are run on each respective device and/or system, e.g., host computing device 102 and/or NVM storage device 104. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units.

Memory 114 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, a system and method include indirection logic in a host computing device that implements NVM primitives while avoiding log-structured storage and its associated overhead. NVM primitives include, but are not limited to, atomic write, atomic multi-write, atomic write, sparse addressing, discard, verify, atomic discard and atomic multi-discard. The indirection logic is configured to manage writing sector(s) of data to a selected byte-accessible NVM storage device in response to a write request without waiting for additional sectors to accumulate. The indirection logic provides an indirection layer configured to map host LBA(s) to device LBA(s). The NVM storage device may then map and/or translate the device LBA(s) to PMA(s).

In some embodiments, a method to look up an address included in unsorted B-tree leaf nodes may be implemented using SIMD (single instruction, multiple data) operations. In other words, parallel (i.e., vector) processing may be implemented, as described herein.

In some embodiments, a plurality of free lists within a shared address space may be managed. One or more of the plurality of free lists within the shared address space may be assigned to a respective processor, core and/or thread. The processor, core and/or thread may then be configured to add and/or remove extents from its assigned free list(s). Thus, lock contention associated with accessing a free list may be avoided.

EXAMPLES

Examples of the present disclosure include subject material such as a method, means for performing acts of the method, a device, or of an apparatus or computer-readable storage device related to host-managed non-volatile memory in solid state drives, as discussed below.

Example 1

According to this example there is provided an apparatus including a processor, a chipset, a memory, and indirection logic. The indirection logic to receive a host logical block address (LBA) associated with a first sector of data, map the host LBA from a host address space to a first device LBA in a device address space, the device address space related to a non-volatile memory (NVM) storage device physical memory address space, and provide the first sector of data and the first device LBA to the NVM storage device.

Example 2

This example includes the elements of example 1, wherein the device address space includes metadata, a transaction log and a data portion.

Example 3

This example includes the elements of example 2, wherein the data portion includes a free list, a plurality of index nodes, a plurality of leaf nodes and a plurality of extents and the indirection logic is further to allocate a leaf node and an extent from the free list, the extent corresponding to the first sector of data.

Example 4

This example includes the elements of example 3, wherein the indirection logic is further to write the host LBA, the first device LBA and a length corresponding to the first sector of data to the leaf node.

Example 5

This example includes the elements according to any one of examples 1 through 4, wherein the indirection logic is further to receive a second sector of data associated with the host LBA, map the host LBA to a second device LBA, provide the second sector of data and the second device LBA to the NVM storage device and update a leaf node to include the second device LBA.

Example 6

This example includes the elements according to any one of examples 1 through 4, wherein the processor is a vector processor and the indirection logic is further to traverse a search tree to look up a plurality of query host LBAs in parallel.

Example 7

This example includes the elements according to any one of examples 2 through 3, wherein the data portion includes a plurality of free lists, each free list managed by a respective processor, core or thread.

Example 8

This example includes the elements according to any one of examples 1 through 4, wherein the indirection logic is further to store one or more index node(s) related to the host address space, the index node(s) to facilitate a search for stored data.

Example 9

This example includes the elements of example 8, wherein the index node(s) are arranged in a search tree.

Example 10

This example includes the elements of example 9, wherein the search tree is a B+-tree.

Example 11

This example includes the elements according to any one of examples 1 through 4, wherein the indirection logic is further to determine whether the first sector of data was successfully stored in the NVM storage device.

Example 12

This example includes the elements according to any one of examples 1 through 4, wherein the indirection logic includes one or more NVM primitive(s) corresponding to one or more of atomic write, atomic discard, atomic multi-write, atomic multi-discard, sparse addressing and verify.

Example 13

This example includes the elements of example 5, wherein the indirection logic is further to discard the first sector of data if the second sector of data was successfully stored.

Example 14

This example includes the elements according to any one of claims 1 through 4, wherein the host address space is larger than the device address space.

Example 15

This example includes the elements according to any one of examples 2 through 3, wherein the transaction log includes a transaction identifier (ID) and at least one log entry related to the first device LBA, each log entry including a log entry type.

Example 16

This example includes the elements of example 15, wherein each log entry type is selected from a list including allocate, free intent, commit and free.

Example 17

This example includes the elements according to any one of examples 1 through 4, wherein the indirection logic is further to create a transaction identifier (ID), determine an allocation size related to the first sector of data, allocate at least one extent, write the first sector of data to one data extent of the at least one extents, and write an index node to a node extent of the at least one extents.

Example 18

This example includes the elements of example 17, wherein the indirection logic is further to write a free intent record to a transaction log associated with the transaction ID for at least one of a data extent and a node extent to be returned to a free list.

Example 19

This example includes the elements of example 17, wherein the indirection logic is further to write a commit record to a transaction log associated with the transaction ID if the first sector of data is successfully stored to the NVM storage device.

Example 20

This example includes the elements of example 17, wherein the indirection logic is further to adjust a root node.

Example 21

This example includes the elements of example 17, wherein the indirection logic is further to read a length of a head extent in a free list, split the head extent into an allocated extent and a remainder extent if a size of the head extent is greater than the allocation size, write a remainder extent size and next pointer to the remainder extent and write an allocation record to a transaction log associated with the transaction ID.

Example 22

This example includes the elements of example 18, wherein the indirection logic is further to write a next device LBA and a length to a freed extent based, at least in part, on the free intent record and to write a free record to the transaction log.

Example 23

This example includes the elements of example 6, wherein the indirection logic is further to compare a vector of stored host LBAs to a look up vector including a plurality of look up LBAs, store a result of the comparison in a first map vector, store, in a max LBA vector, a sum of the vector of stored host LBAs and a vector of respective lengths associated with the stored host LBAs, store a result of a comparison of the lookup vector and the max LBA vector in a second map vector and determine whether each lookup host LBA corresponds to a respective stored host LBA based, at least in part, on a comparison of the first map vector and second map vector.

Example 24

According to this example there is provided a method. The method includes receiving, by indirection logic, a host logical block address (LBA) associated with a first sector of data; mapping, by the indirection logic, the host LBA from a host address space to a first device LBA in a device address space, the device address space related to a non-volatile memory (NVM) storage device physical memory address space; providing, by the indirection logic, the first sector of data and the first device LBA to the NVM storage device.

Example 25

This example includes the elements of example 24, wherein the device address space includes metadata, a transaction log and a data portion.

Example 26

This example includes the elements of example 25, and further includes allocating, by the indirection logic, a leaf node and an extent from a free list, the extent corresponding to the first sector of data, the data portion including the free list, a plurality of index nodes, a plurality of leaf nodes and a plurality of extents.

Example 27

This example includes the elements of example 26, and further includes writing, by the indirection logic, the host LBA, the first device LBA and a length corresponding to the first sector of data to the leaf node.

Example 28

This example includes the elements of example 24, and further includes receiving, by the indirection logic, a second sector of data associated with the host LBA; mapping, by the indirection logic, the host LBA to a second device LBA; providing, by the indirection logic, the second sector of data and the second device LBA to the NVM storage device; and updating, by the indirection logic, a leaf node to include the second device LBA.

Example 29

This example includes the elements of example 24, and further includes traversing, by the indirection logic, a search tree to lookup a plurality of query host LBAs in parallel.

Example 30

This example includes the elements of example 25, wherein the data portion includes a plurality of free lists, each free list managed by a respective processor, core or thread.

Example 31

This example includes the elements of example 24, and further includes storing, by the indirection logic, one or more index node(s) related to the host address space, the index node(s) to facilitate a search for stored data.

Example 32

This example includes the elements of example 31, wherein the index node(s) are arranged in a search tree.

Example 33

This example includes the elements of example 32, wherein the search tree is a B+-tree.

Example 34

This example includes the elements of example 24, and further includes determining, by the indirection logic, whether the first sector of data was successfully stored in the NVM storage device.

Example 35

This example includes the elements of example 24, wherein the indirection logic includes one or more NVM primitive(s) corresponding to one or more of atomic write, atomic discard, atomic multi-write, atomic multi-discard, sparse addressing and verify.

Example 36

This example includes the elements of example 28, and further includes discarding, by the indirection logic, the first sector of data if the second sector of data was successfully stored.

Example 37

This example includes the elements of example 24, wherein the host address space is larger than the device address space.

Example 38

This example includes the elements of example 25, wherein the transaction log includes a transaction identifier (ID) and at least one log entry related to the first device LBA, each log entry including a log entry type.

Example 39

This example includes the elements of example 38, wherein each log entry type is selected from a list including allocate, free intent, commit and free.

Example 40

This example includes the elements of example 24, and further includes creating, by the indirection logic, a transaction identifier (ID); determining, by the indirection logic, an allocation size related to the first sector of data; allocating, by the indirection logic, at least one extent; writing, by the indirection logic, the first sector of data to one data extent of the at least one extents; and writing, by the indirection logic, an index node to a node extent of the at least one extents.

Example 41

This example includes the elements of example 40, and further includes writing, by the indirection logic, a free intent record to a transaction log associated with the transaction ID for at least one of a data extent and a node extent to be returned to a free list.

Example 42

This example includes the elements of example 40, and further includes writing, by the indirection logic, a commit record to a transaction log associated with the transaction ID if the first sector of data is successfully stored to the NVM storage device.

Example 43

This example includes the elements of example 40, and further includes adjusting, by the indirection logic, a root node.

Example 44

This example includes the elements of example 40, and further includes reading, by the indirection logic, a length of a head extent in a free list; splitting, by the indirection logic, the head extent into an allocated extent and a remainder extent if a size of the head extent is greater than the allocation size; writing, by the indirection logic, a remainder extent size and next pointer to the remainder extent; and writing, by the indirection logic, an allocation record to a transaction log associated with the transaction ID.

Example 45

This example includes the elements of example 41, and further includes writing, by the indirection logic, a next device LBA and a length to a freed extent based, at least in part, on the free intent record; and writing, by the indirection logic, a free record to the transaction log.

Example 46

This example includes the elements of example 29, and further includes comparing, by the indirection logic, a vector of stored host LBAs to a look up vector including a plurality of look up LBAs; storing, by the indirection logic, a result of the comparison in a first map vector; storing, by the indirection logic, in a max LBA vector, a sum of the vector of stored host LBAs and a vector of respective lengths associated with the stored host LBAs; storing, by the indirection logic, a result of a comparison of the lookup vector and the max LBA vector in a second map vector; and determining, by the indirection logic, whether each lookup host LBA corresponds to a respective stored host LBA based, at least in part, on a comparison of the first map vector and second map vector.

Example 47

According to this example there is provided a computer-readable storage device having stored thereon instructions that when executed by one or more processors result in the following operations including receiving a host logical block address (LBA) associated with a first sector of data; mapping the host LBA from a host address space to a first device LBA in a device address space, the device address space related to a non-volatile memory (NVM) storage device physical memory address space; providing the first sector of data and the first device LBA to the NVM storage device.

Example 48

This example includes the elements of example 47, wherein the device address space includes metadata, a transaction log and a data portion.

Example 49

This example includes the elements of example 48, wherein the instructions that when executed by one or more processors results in the following additional operations including allocating a leaf node and an extent from a free list, the extent corresponding to the first sector of data, the data portion including the free list, a plurality of index nodes, a plurality of leaf nodes and a plurality of extents.

Example 50

This example includes the elements of example 49, wherein the instructions that when executed by one or more processors results in the following additional operations including writing the host LBA, the first device LBA and a length corresponding to the first sector of data to the leaf node.

Example 51

This example includes the elements according to any one of examples 47 through 50, wherein the instructions that when executed by one or more processors results in the following additional operations including receiving a second sector of data associated with the host LBA, mapping the host LBA to a second device LBA, providing the second sector of data and the second device LBA to the NVM storage device, and updating a leaf node to include the second device LBA.

Example 52

This example includes the elements according to any one of examples 47 through 50, wherein the instructions that when executed by one or more processors results in the following additional operations including traversing a search tree to lookup a plurality of query host LBAs in parallel.

Example 53

This example includes the elements according to any one of examples 48 and 49, wherein the data portion includes a plurality of free lists, each free list managed by a respective processor, core or thread.

Example 54

This example includes the elements according to any one of examples 47 through 50, wherein the instructions that when executed by one or more processors results in the following additional operations including storing one or more index node(s) related to the host address space, the index node(s) to facilitate a search for stored data.

Example 55

This example includes the elements of example 54, wherein the index node(s) are arranged in a search tree.

Example 56

This example includes the elements of example 55, wherein the search tree is a B+-tree.

Example 57

This example includes the elements according to any one of examples 47 through 50, wherein the instructions that when executed by one or more processors results in the following additional operations including determining whether the first sector of data was successfully stored in the NVM storage device.

Example 58

This example includes the elements according to any one of examples 47 through 50, wherein the instructions include one or more NVM primitive(s) corresponding to one or more of atomic write, atomic discard, atomic multi-write, atomic multi-discard, sparse addressing and verify.

Example 59

This example includes the elements of example 51, wherein the instructions that when executed by one or more processors results in the following additional operations including discarding the first sector of data if the second sector of data was successfully stored.

Example 60

This example includes the elements according to any one of examples 47 through 50, wherein the host address space is larger than the device address space.

Example 61

This example includes the elements according to any one of examples 48 and 49, wherein the transaction log includes a transaction identifier (ID) and at least one log entry related to the first device LBA, each log entry including a log entry type.

Example 62

This example includes the elements of example 61, wherein each log entry type is selected from a list including allocate, free intent, commit and free.

Example 63

This example includes the elements according to any one of examples 47 through 50, wherein the instructions that when executed by one or more processors results in the following additional operations including creating a transaction identifier (ID), determining an allocation size related to the first sector of data, allocating at least one extent, writing the first sector of data to one data extent of the at least one extents, and writing an index node to a node extent of the at least one extents.

Example 64

This example includes the elements of example 63, wherein the instructions that when executed by one or more processors results in the following additional operations including writing a free intent record to a transaction log associated with the transaction ID for at least one of a data extent and a node extent to be returned to a free list.

Example 65

This example includes the elements of example 63, wherein the instructions that when executed by one or more processors results in the following additional operations including writing a commit record to a transaction log associated with the transaction ID if the first sector of data is successfully stored to the NVM storage device.

Example 66

This example includes the elements of example 63, wherein the instructions that when executed by one or more processors results in the following additional operations including adjusting a root node.

Example 67

This example includes the elements of example 63, wherein the instructions that when executed by one or more processors results in the following additional operations including reading a length of a head extent in a free list, splitting the head extent into an allocated extent and a remainder extent if a size of the head extent is greater than the allocation size, writing a remainder extent size and next pointer to the remainder extent, and writing an allocation record to a transaction log associated with the transaction ID.

Example 68

This example includes the elements of example 64, wherein the instructions that when executed by one or more processors results in the following additional operations including writing a next device LBA and a length to a freed extent based, at least in part, on the free intent record; and writing a free record to the transaction log.

Example 69

This example includes the elements of example 52, wherein the instructions that when executed by one or more processors results in the following additional operations including comparing a vector of stored host LBAs to a look up vector including a plurality of look up LBAs, storing a result of the comparison in a first map vector; storing in a max LBA vector, a sum of the vector of stored host LBAs and a vector of respective lengths associated with the stored host LBAs, storing a result of a comparison of the lookup vector and the max LBA vector in a second map vector, and determining whether each lookup host LBA corresponds to a respective stored host LBA based, at least in part, on a comparison of the first map vector and second map vector.

Example 70

According to this example there is computer-readable storage device having stored thereon instructions that when executed by one or more processors result in the following operations including the method according to any one of examples 24 to 46.

Example 71

Another example of the present disclosure is a system including at least one device arranged to perform the method of any one of examples 24 to 46.

Example 72

Another example of the present disclosure is a device including means to perform the method of any one of examples 24 to 46.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
    a processor;
    a chipset;
    a memory; and
    indirection logic to:
        receive a host logical block address (LBA) associated with a first sector of data,
        map the host LBA from a host address space to a first device LBA in a device address space, the device address space related to a non-volatile memory (NVM) storage device physical memory address space, and
        provide the first sector of data and the first device LBA to the NVM storage device; wherein:
        the device address space comprises metadata, a transaction log, and a data portion;
        the data portion comprises a free list, a plurality of index nodes, a plurality of leaf nodes and a plurality of extents; and
        the indirection logic is further to allocate a leaf node and an extent from the free list, the extent corresponding to the first sector of data.

2. The apparatus of claim 1, wherein the indirection logic is further to write the host LBA, the first device LBA and a length corresponding to the first sector of data to the leaf node.

3. The apparatus claim 1, wherein the indirection logic is further to receive a second sector of data associated with the host LBA, map the host LBA to a second device LBA, provide the second sector of data and the second device LBA to the NVM storage device and update a leaf node to comprise the second device LBA.

4. The apparatus of claim 1, wherein the processor is a vector processor and the indirection logic is further to traverse a search tree to lookup a plurality of query host LBAs in parallel.

5. The apparatus of claim 1, wherein the data portion comprises a plurality of free lists, each free list managed by a respective processor, core or thread.

6. The apparatus of claim 1, wherein the indirection logic comprises one or more NVM primitive(s) corresponding to one or more of atomic write, atomic discard, atomic multi-write, atomic multi-discard, sparse addressing and verify.

7. A method comprising:
    receiving, by indirection logic, a host logical block address (LBA) associated with a first sector of data;
    mapping, by the indirection logic, the host LBA from a host address space to a first device LBA in a device address space, wherein the device address space is related to a non-volatile memory (NVM) storage device physical memory address space and comprises metadata, a transaction log and a data portion;
    providing, by the indirection logic, the first sector of data and the first device LBA to the NVM storage device; and
    allocating, by the indirection logic, a leaf node and an extent from a free list, the extent corresponding to the first sector of data, the data portion comprising the free list, a plurality of index nodes, a plurality of leaf nodes and a plurality of extents.

8. The method of claim 7, further comprising:
    writing, by the indirection logic, the host LBA, the first device LBA and a length corresponding to the first sector of data to the leaf node.

9. The method of claim 7, further comprising:
    receiving, by the indirection logic, a second sector of data associated with the host LBA;
    mapping, by the indirection logic, the host LBA to a second device LBA;
    providing, by the indirection logic, the second sector of data and the second device LBA to the NVM storage device; and
    updating, by the indirection logic, a leaf node to comprise the second device LBA.

10. The method of claim 7, further comprising traversing, by the indirection logic, a search tree to lookup a plurality of query host LBAs in parallel.

11. The method of claim 7, wherein the data portion comprises a plurality of free lists, each free list managed by a respective processor, core or thread.

12. The method of claim 7, wherein the indirection logic comprises one or more NVM primitive(s) corresponding to one or more of atomic write, atomic discard, atomic multi-write, atomic multi-discard, sparse addressing and verify.

13. A non-transitory computer-readable storage device having stored thereon instructions that when executed by one or more processors result in the following operations comprising:
    receiving a host logical block address (LBA) associated with a first sector of data;
    mapping the host LBA from a host address space to a first device LBA in a device address space, wherein the device address space is related to a non-volatile memory (NVM) storage device physical memory address space and comprises metadata, transaction log and a data portion;
    providing the first sector of data and the first device LBA to the NVM storage device; and allocating a leaf node and an extent from a free list, the extent corresponding to the first sector of data, the data portion comprising the free list, a plurality of index nodes, a plurality of leaf nodes and a plurality of extents.

14. The non-transitory computer-readable storage device of claim 13, wherein the instructions that when executed by one or more processors results in the following additional operations comprising:
  writing the host LBA, the first device LBA and a length corresponding to the first sector of data to the leaf node.

15. The non-transitory computer-readable storage device of claim 13, wherein the instructions that when executed by one or more processors results in the following additional operations comprising:
  receiving a second sector of data associated with the host LBA; mapping the host LBA to a second device LBA; providing the second sector of data and the second device LBA to the NVM storage device; and
  updating a leaf node to comprise the second device LBA.

16. The non-transitory computer-readable storage device of claim 13, wherein the instructions that when executed by one or more processors results in the following additional operations comprising:
  traversing a search tree to lookup a plurality of query host LBAs in parallel.

17. The non-transitory computer-readable storage device of claim 13, wherein the data portion comprises a plurality of free lists, each free list managed by a respective processor, core or thread.

18. The non-transitory computer-readable storage device of claim 13, wherein the instructions comprise one or more NVM primitive(s) corresponding to one or more of atomic write, atomic discard, atomic multi-write, atomic multi-discard, sparse addressing and verify.

* * * * *